(12) United States Patent
Senner et al.

(10) Patent No.: US 11,541,755 B2
(45) Date of Patent: Jan. 3, 2023

(54) DISPLAY DEVICE AND VEHICLE WITH THE DISPLAY DEVICE

(71) Applicant: AUDI AG, Ingolstadt (DE)

(72) Inventors: Bernhard Senner, Ingolstadt (DE); Ulrich Mueller, Ingolstadt (DE); Jacques Helot, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/281,125

(22) PCT Filed: Sep. 24, 2019

(86) PCT No.: PCT/EP2019/075582
§ 371 (c)(1),
(2) Date: Mar. 29, 2021

(87) PCT Pub. No.: WO2020/074246
PCT Pub. Date: Apr. 16, 2020

(65) Prior Publication Data
US 2021/0354561 A1    Nov. 18, 2021

(30) Foreign Application Priority Data

Oct. 8, 2018  (EP) ..................... 18199030

(51) Int. Cl.
*B60K 37/02*    (2006.01)
*G09G 5/10*    (2006.01)

(52) U.S. Cl.
CPC .............. *B60K 37/02* (2013.01); *G09G 5/10* (2013.01); *B60K 2370/149* (2019.05);
(Continued)

(58) Field of Classification Search
CPC .............. B60K 37/02; B60K 2370/149; B60K 2370/343; B60K 2370/349;
(Continued)

(56) References Cited

U.S. PATENT DOCUMENTS 8,611,006 B2    12/2013  Kleinberger et al.
2003/0184692 A1    10/2003  Nagae
(Continued)

FOREIGN PATENT DOCUMENTS

DE    10 2014 014 412 A1    3/2016
EP    18199030.0    10/2018
EP    PCT/EP2019/075582    9/2019

OTHER PUBLICATIONS

International Search Report dated Dec. 11, 2019 from International Application No. PCT/EP2019/075582, 2 pages.
(Continued)

*Primary Examiner* — Christopher E Leiby
(74) *Attorney, Agent, or Firm* — Staas & Halsey LLP

(57) ABSTRACT

A display panel has a first and second layers and a control unit. The first layer is a pixel matrix. The control unit is designed to actuate at least one pixel element for displaying at least one graphic display object. In a respective non-actuated state each pixel element is transparent. The second layer is partitioned into predetermined primary subareas each having an adjustable degree of light transmission. The primary subareas are separated by a primary space. The control unit is adapted to adjust a respective light transmission to a predetermined individual degree for each of the predetermined primary subareas independent of each other. The display panel also has a third layer designed to attenuate light in the primary space.

18 Claims, 6 Drawing Sheets

(52) U.S. Cl.
 CPC ........... *B60K 2370/1523* (2019.05); *B60K 2370/343* (2019.05); *B60K 2370/349* (2019.05); *G09G 2320/0626* (2013.01); *G09G 2380/10* (2013.01)

(58) Field of Classification Search
 CPC .... B60K 2370/1523; B60K 2370/0626; G09G 5/10; G09G 2380/10
 See application file for complete search history.

(56) References Cited

U.S. PATENT DOCUMENTS

| | | | | |
|---|---|---|---|---|
| 2011/0286073 | A1* | 11/2011 | Lo | G02B 26/005 359/290 |
| 2014/0185129 | A1* | 7/2014 | Kim | G02F 1/167 359/296 |
| 2016/0071448 | A1 | 3/2016 | Schwarz et al. | |
| 2017/0139496 | A1 | 5/2017 | Kang et al. | |
| 2017/0212398 | A1 | 7/2017 | Cao et al. | |
| 2018/0128044 | A1* | 5/2018 | Ochiai | E06B 9/24 |
| 2018/0182314 | A1* | 6/2018 | Staton | A61G 11/00 |
| 2018/0188531 | A1* | 7/2018 | Dubey | H01L 27/3232 |
| 2019/0146216 | A1* | 5/2019 | Mourou | B60J 1/02 280/781 |

OTHER PUBLICATIONS

Extended European Search Report dated Mar. 20, 2019 from European Application No. 18199030.0, 5 pages.

\* cited by examiner

11,541,755 B2

DISPLAY DEVICE AND VEHICLE WITH THE DISPLAY DEVICE

CROSS REFERENCE TO RELATED APPLICATIONS

This application is a U.S. national stage of International Application No. PCT/EP2019/075582, filed on Sep. 24, 2019. The International Application claims the priority benefit of European Application No. 18199030.0 filed on Oct. 8, 2018. Both the International Application and the European Application are incorporated by reference herein in their entirety.

BACKGROUND

Described below are a display device and a vehicle with such a display device.

Nowadays a display device has become an integral part of a vehicle. The display device usually has a display panel or a touch screen which usually functions as a user interface. This enables a user, who can be the driver of the vehicle, to communicate with and/or to operate other devices in the vehicle remotely by the display panel or the touch screen. In this way, operating functions or driver assistance functions of the other devices of the vehicle can be made available to the user for selection. Usually, display devices are integrated within a dashboard or within a central console of the vehicle. With an increasing number of operating and comfort functions available for the user in the vehicle, it is necessary on one hand to enable a simplified operation of these functions and on the other hand to present a multitude and/or different types of information in a clear and understandable manner to the user. The user can communicate with the other devices through the display panel by touch or voice signals. Furthermore, in the case of an autonomous or self-driving mode of the vehicle, a requirement of a large display panel is further enhanced. However, the presence of a large display panel reduces the perceived interior volume of the vehicle room which needs to be avoided and furthermore, in the case of a manual driving of the vehicle, the presence of such a large display panel leads to an hindrance for the user to view the environment outside in front of the vehicle through a windscreen, which can be hidden behind the display panel.

Document US 2017/139496 A1 discloses a mobile terminal and a method for controlling the mobile terminal, wherein in the mobile terminal can control transparency of at least part of a display having controllable transparency to a user touch interaction. However, a large display panel which can be integrated in a vehicle and a solution to the problems related to the presence of a large display panel in the vehicle are not disclosed.

Document US 2016/0071448 A1 discloses a display screen for secure presentation of information comprising a background grid with light-emitting background grid elements of a first type and light-emitting or light-blocking background grid elements of a second type. A foreground grid having completely light-transmissive foreground grid elements and light-emitting foreground grid elements are arranged in front of the background grid. The lateral dimensions of the foreground grid elements, the distance and the lateral position of the foreground grid are matched in relation to the foreground grid in such a manner that a viewer looking at the foreground grid perceives a coded information in a decoded form. However, a large display panel which can be integrated in a vehicle and a solution to the problems related to the presence of such a large display panel in the vehicle are not disclosed.

Document DE 10 2014 014 412 A1 discloses a vehicle, comprising an operating device with a touch screen having luminous pixel elements, and a control unit which is designed for this purpose, to display a graphical user interface on the touch screen by the pixel elements, and, depending on a touch signal of the touch screen to control at least one device of the vehicle other than the operating device by a control signal.

SUMMARY

Described below is a display device for a vehicle which provides a clear display of display contents and enables the display device to be integrated in the vehicle in such a manner that only a small perceived space in an interior room of the vehicle is occupied by the display device. Furthermore, a display panel of the display device is only opaque where the display contents are displayed, the rest of the display panel is as unobtrusive as possible. The term clear display implies that a user can view the display contents in an ergonomically comfortable manner, such that all the information of the display content are perceivable by the user.

The inventors had a realization that two different goals need to be achieved, in order to enable both a comfortable as well as safe driving of a user, who is a driver of a vehicle, at the same time. A first goal is comfortable driving by the user of the vehicle is made possible. This is achieved by a display panel larger than 0.15 sq. meters, particularly larger than 0.4 sq. meters or between 0.3-0.45 sq. meters, which enables a display of the display contents in a clear and understandable manner to the user in the vehicle. For example, the display panel can be 1 meter in length and have a height ranging between of 14 centimeters and 30 centimeters. However, the size of the display panel is can be of other dimensions than the aforementioned dimensions, which can be understood by a person with ordinary skills in the related field. At the same time, this enables the user to reach or achieve the functionalities of other devices by a touch or voice signal through a user interface provided by the display panel of the display device in a comfortable manner. However, the presence of a large display panel, especially in front of the windscreen can be problematic for the case of an achievement of a second goal. The second goal is concerned with the safety of the user of the vehicle. The presence of a large display panel can provide a hindrance to the user to drive, because the large display panel blocks the view of the user, so that he or she is unable to view the contents behind the display panel. For example, the large display panel which is integrated on the dashboard of the vehicle covers or blocks a large part of the view behind the display panel or the windscreen so that the driver, especially in the case of manual driving, is unable to view the contents or the outside environment in front of the vehicle. In other words, in a drivers field of vision, that is the outside environment behind the display panel is covered by the display device. Hence, some of the traffic behind the windscreen might not be accessible to the driver. Furthermore, a particularly large display device can subject to create a particularly negative sense of space for the user and/or another occupant of the vehicle, since the display device can enter his or her personal free space and make the interior room to be perceived to be small, which in turn would make the user and/or the another occupant inside the vehicle feel cramped. Furthermore, the display of display contents on a large screen can have a distracting effect to the user while driving the vehicle manually. Hence, it is necessary to take required measures in order to achieve a comfortable driving as per the first goal, and at the same time the safe driving of the vehicle as per the second goal. In order to achieve both of the above mentioned goals, the display device has a display panel with an adjustable degree of light transmission. In other words, the display panel can be transparent. The display panel is designed for displaying at least one graphic display object, for example, a logo and/or an app. The display panel includes a first layer and a second layer, wherein the first layer is a pixel matrix. Furthermore, the display device has a control unit designed to actuate at least one pixel element of the pixel matrix for displaying the at least one graphic display object, wherein in a respective non-actuated state each pixel element is transparent.

The first layer, for example, is designed as a transparent screen with a large number of monochromatic organic light emitting diodes (OLED) as pixel elements. The organic light emitting diodes can be distributed over a total area of the transparent screen. The control unit controls an actuation of the organic light emitting diodes as per a required location or position of the at least one graphic display object on display panel with respect to an optimal viewability of the user. Furthermore, the first layer can be designed as another transparent screen with transparent organic light emitting diodes (TOLED) or a so called polymer dispersed liquid crystal (PDLC) or a dynamic scattered liquid crystal (DSLC) or a suspended particle device (SPD) or a monochrome transparent segmented liquid crystal device or a thin-film transistor screen (TFT). In the respective non-actuated state each pixel element of the first layer remains transparent. If at a point of time, a graphic display object is needed to be displayed on a particular location on the display panel, then the control unit activates a plurality of pixel elements at that particular location, which in turn enables the plurality of pixel elements of that particular location on the first layer of the display panel to radiate a monochromatic light or a light of various colors corresponding to the graphic display object. The output of the graphic display object may be requested by a first control signal that may be received by the control unit. However, the other pixel elements correspond to a non-activated state and hence, remain transparent. This enables the rest of first layer, which is not occupied by the at least one graphic display object to remain transparent.

The display panel's second layer has a total surface area of the same size or at least 80% of the size of the first layer and can be attached to the first layer by a mechanical connection, or glued, or laminated, which can be known to a person with ordinary skill in the related field. The second layer is partitioned into a plurality of predetermined primary subareas each having an adjustable degree of light transmission. The primary subareas can be for example, in a quadrilateral and/or a triangular and/or a polygonal shape. Moreover, the primary subareas can be of different shapes distributed over the entire surface area of the second layer. The primary subareas can be arranged in such a manner, that they are distributed over the entire surface area of the second layer. The primary subareas of the second layer can be designed to allow a transmission of electricity or are electrically conductive. In order to achieve an adjustable degree of light transmission, a voltage difference can be enabled across each of the primary subareas. This can enable a transformation of each of the primary subareas from a transparent state to an opaque state depending on the degree of the voltage difference across that particular primary subarea. For example, in the case of PDLC or DSLC, it is possible to achieve different degrees of transparency dynamically by adjusting the voltage. Hence, in order to achieve the voltage difference to enable the adjustable degree of light transmission, the primary subareas are surrounded by a primary space, which can enable a wiring across the respective primary subarea. The wiring can enable the voltage difference across that particular primary subarea. The primary space can be about 0.1 millimeter in width. In other words, the primary subareas can be situated at about 0.1 millimeter apart from each other.

The control unit is adapted to adjust a respective light transmission to a predetermined individual degree for each of the plurality of the predetermined primary subareas of the second layer independent of the other primary subareas. In other words, in order to transform a particular primary subarea from a transparent state to an opaque state or in between the transparent state and opaque state, as in the case of PDLC or DSLC, or to adjust the predetermined degree of light transmission to a particular primary subarea, the control unit can adjust a voltage difference across the particular primary subarea in such a manner, that the particular primary subarea is transformed to the opaque state as per requirement. This can be done in such a manner, that the other remaining primary subareas remain unaltered and remain in a transparent state. The degree of light transmission can be requested by a second control signal. For example, a particular predetermined region of the second layer can be located behind the pixel matrix of the first layer. The degree of light transmission of the particular predetermined region of the display panel can be adjusted by the control unit, such that the respective predetermined region can be adjusted between a transparent state, in which the degree of light transmission for example is at least 40 percent and/or at least 50 percent and/or 60 percent and/or 70 percent and/or 80 percent and in an opaque state, in which the light transmission is less than 30 percent and/or less than 20 percent and/or less than 10 percent. In the transparent state, a room and/or an environment corresponding to the field of vision of the user behind the display panel can thus be visible through the display panel in the predetermined primary subareas which are in the transparent state. In a transparent state, for example with 50 percent of light transmission and with enough light from the outside, the display panel may look quite transparent. In other words, the user of the vehicle can perceive as if there is no display panel in front of the user, this enables the user to perceive a larger interior room inside the vehicle, which in turn enables the user to feel free or not being cramped. Furthermore, the user when driving the vehicle manually, is less distracted by the display panel in the transparent state than if the display panel were to appear in the opaque state. Hence, the user can perceive a larger space in the interior room of the vehicle and is not distracted due to the presence of the display panel in front of the user.

In order to display a particular at least one graphic display object at a particular region on the display panel, the primary subareas of the second layer corresponding to that particular region that needs to be occupied by the at least one graphic display object are transformed to an opaque state. The pixel elements, for example of the transparent OLED, of the first layer lying about the primary subareas in the opaque state are activated by the control unit so that the transparent OLEDs radiate colors according to the requirement of the at least one graphic display object. Hence, a display of the at least one graphic display object on the particular region on the display panel is enabled by the control unit and the two layers of the display panel.

However, a transparent OLED can display several colors but not black color. The primary subareas of the second layer can be of black color in an opaque state or in a state between the transparent state and the opaque state. In this case, in order to depict a black color, the primary subareas of the second layer corresponding to a particular region of the at least one graphic display object are transformed to the opaque state, whereas the pixel elements of the first layer, which lie in front of particular region or at least a part corresponding particular primary subareas, are not actuated by the control unit. This can enable the user to view the primary subareas in the opaque state, since the pixel elements on top of this primary subareas remain transparent, as they are now in a non-activated state. This leads to a formation of a black colored image or a black colored region of the at least one graphic display object. However, due to the presence of the primary spaces between the primary subareas, which in turn may be transparent or nearly transparent, in the case when the primary subareas and a foil in between is not 100 percent transparent, the transparent or nearly transparent primary spaces can be seen between the black colored opaque primary subareas. This can lead to a formation of an inhomogeneous depiction of a black region of the at least one graphic display object. However, a homogenous black image or a black region on graphic display object or a black background around a graphic display object is ergonomically and aesthetically desirable. Hence, in order to depict a homogeneous black background, the display panel includes a third layer, wherein the third layer is designed to attenuate light in the primary space between each of the primary subareas. This is of advantage, because in the case of a black background, the primary space between the primary subareas which was earlier in the form of a transparent region or as a transparent space between the black colored opaque primary sub-areas, can now be occupied by the third layer, which in turn attenuates the transmission of light. This can lead to the formation of a homogeneous black background as desired. This is of further advantage, because the third layer offers a simple and an inexpensive way to achieve the desired homogenous black image or black background corresponding to a graphic display object.

The embodiments described herein provide features which afford additional technical advantages.

In one embodiment, the third layer can has a webbed structure, wherein the webbed structure includes an opaque material and is designed to cover the primary space between each of the primary subareas. In other words, the webbed structure can be in the form of a pattern which can be printed or otherwise applied to cover the primary space between the primary subareas fully or partially. In a case, when the first layer is in a non-activated state or the pixel elements of the first layer are in a non-activated state, then the first layer is transparent and at the same time, if the second layer is at a transparent state, then the webbed structure becomes viewable. However, the predetermined primary subareas are transformed to opaque state, then a homogeneous black background or black region or black image is viewable. The terms background, region and image depict the same meaning. This is of advantage, because this enables the formation of a homogeneous black or monochromatic background or black region or black image as desired when a graphic display object or at least a part of the at least one graphic display object of black color is desired. Furthermore, there may be a little overlap between the webbed structure and the primary space because of tolerances, hence, the webbed structure may be designed to be wider than the primary space.

In one embodiment, the opaque material has a black or a grey color. This is of advantage, because in a case when a homogeneous black background is desired, then the presence of the webbed structure formed of the opaque material in a black color enables the formation of a homogeneous black background. However, in the case when the display panel is transparent, then the black colored webbed structure remains viewable on the transparent display panel. This can however be optimized by enabling the opaque material to be in a grey color, this could be used as a compromise between the presence of a homogeneous black background and a minimization of the presence of a viewable webbed structure, in the case when the display panel is in the transparent state.

In one embodiment, the control unit is designed to determine the respective primary subareas, which are at least partly occupied by at least one graphic display object. The control unit can be adapted to adjust the light transmission of the respective primary subareas to a degree lower than that of the primary subareas, which are not at least partly occupied by the at least one graphic display object. In other words, the control unit can identify a region and/or location on the display panel where the at least one graphic display object needs to be displayed. Furthermore, as per a predetermined degree of brightness or contrast of the at least one graphic display object, the degree of transparency of the primary subareas that are to be covered by the at least one graphic display object on that particular location on the display panel, is adapted by the control unit. These particular primary subareas are adjusted in such a manner that the light transmission is reduced to a certain degree whereas the transmission of light of the remaining subareas is allowed such that they appear in the transparent state. This enables the user to view the at least one graphic display object at a particular location on the display unit in a clear manner and at the same time the user can have a clear view of the outside environment behind the display panel, that is behind the windscreen, so that he or she can drive the vehicle in a proper and safe manner.

In one embodiment, the third layer has a plurality of predetermined secondary subareas each having an adjustable degree of light transmission, wherein the secondary subareas are separated by a secondary space between each of them. The control unit can be adapted to adjust a respective light transmission to a predetermined individual degree for each of the plurality of the predetermined secondary subareas of the third layer independent of each of the respective secondary subareas. In other words, the third layer is in the form of the second layer, where the predetermined secondary subareas can be electrically conducting, such that the degree of transmission of light through each of the secondary subareas can be adjusted by adjusting a voltage difference across the corresponding secondary subareas. Similar to the primary subareas of the second layer, the secondary subareas of the third layer can be separated by a secondary space between each of them. The secondary space between each of the secondary subareas is due to the wiring which is needed to provide the voltage difference between each of the corresponding secondary subareas. Furthermore, the secondary subareas can have a quadrilateral form and/or a triangular form and/or a polygonal form or a mixture of different forms, such that a sum of the areas of the secondary subareas and the secondary space between them forms the area of the entire third layer. The secondary subareas can be of a similar shape and/or size as compared to the primary subareas. Furthermore, the secondary subareas can be of a different shape and/or size as compared to the primary subareas. Moreover, the secondary subareas can be of a partly similar and/or of partly different shape and/or size as compared to the primary subareas. The control unit can be adapted to adjust the light transmission to a predetermined individual degree of each of the plurality of predetermined secondary subareas in a similar manner as described in the case of the primary subareas of the second layer. This is of advantage because this enables an attenuation of light in the case, especially when a black background is required. Since, the secondary subareas of the third layer are located to cover the primary spaces of the second layer from behind, a homogeneous black background as a whole can be enabled on the display panel.

In one embodiment, the plurality of predetermined secondary subareas are arranged such that, each of the plurality of predetermined secondary areas cover partly or completely the primary space between each of the plurality of the predetermined primary subareas. In other words, the third layer may have secondary subareas which overlap to cover the primary spaces of the second layer. In other words, the secondary subareas behind the primary subareas of the second layer are arranged such that the secondary subareas are at an offset as compared to the primary subareas. This enables that the secondary subareas to occupy partly or completely the primary space between each of the plurality of the predetermined primary subareas from behind. This is of advantage, because in the case of a requirement of a black background, where the first layer can be maintained at a transparent state, i.e., the pixel elements of the first layer of the at least one graphic display object are kept at an non-activated state and the corresponding primary subareas of the second layer, which may be covered by the at least one graphic display object, can be kept at an opaque state. In this case, due to the presence of the secondary subareas covering partly or completely the primary space between the corresponding each of the predetermined primary subareas, an attenuation of light can be achieved at the primary space between each of the plurality of predetermined primary subareas. Hence, a homogeneous black background can be enabled due to the presence of the plurality of the secondary subareas covering partly or completely the primary space between each of the plurality of the predetermined primary subareas.

In one embodiment, the control unit is designed to determine the respective primary subareas and respective secondary subareas, which are at least partly occupied by the at least one graphic display object. The control unit is adapted to adjust the light transmission of the respective primary subareas and respective secondary subareas to a degree lower than that of the primary subareas and secondary subareas, which are not at least partly occupied by the at least one graphic display object. This ensures that a graphic display object of a required size and at a required location on the display panel can be formed on the display panel, so that the user can have a comfortable view of the display contents that are displayed on the display panel. At the same time the transparent background of the rest of the display panel can be achieved, so that the user can have a view of the environment of the vehicle behind the display panel, that is behind the windscreen, so that he or she can drive the vehicle further in a save manner.

In one embodiment, the display device includes a gaze tracking unit which is designed to track a view direction of a user, wherein the control unit is designed to determine a display position of the at least one graphic display object on a predefined plurality of primary subareas in dependence with the tracked view direction. The display position is a position or location on the display panel, at which the at least one graphic display object can be displayed. For example, the display device may include a camera which can enable to determine the field of vision of the user, such that the camera sends a view signal to the control unit which in turn enables the formation of the at least one graphic display object according to the view signal, that is the position or region on the display which would lie in the field of view of the user or which would lie at a predefined threshold distance on the display panel from the field of view of the user. This can enable the formation of the at least one graphic display object at a position, which can be easily and comfortably be viewed by the user while driving the vehicle and at the same time the rest of the display panel can be maintained at a transparent state, so that the viewer can have a clear view of the traffic or the environment of the vehicle which lies behind the display panel or the windscreen. Furthermore, this helps to reduce the computational requirement for displaying the required at least one graphic display object on the display panel. Since, according to the view signal, a particular size of the region and the location of the region on the display panel can located and the activation of the corresponding pixel elements in the first layer and the regulation of the attenuation of light through the second layer and the third layer can be confined to this particular region. This in turn can enable a reduction in the computational requirement, since the displaying of the at least one graphic object can be confined only to this particular region as per the view signal. It is further thinkable, that the control unit is designed to determine a display position of the at least one graphic display object on a predefined plurality of primary subareas and the aforementioned secondary subareas in dependence with the tracked view direction.

The vehicle described herein has a display device with a display panel for displaying at least one graphic display object, and a control unit.

In one embodiment, the control unit of the display device is designed to adjust a respective light transmission to a predetermined individual degree for each of the plurality of predetermined primary subareas of the second layer in dependence with a driving situation of the vehicle. For example, the driving situation can be the situation corresponding to a manual driving of the vehicle or a situation corresponding to an autonomous driving or self-driving of the vehicle. In the case of the manual driving situation of the vehicle, the control unit can display the display content of the at least one graphic display object in such a manner that a least possible space on the display panel may be occupied by the at least one graphic display object and moreover, the location of the at least one graphic display object to be displayed is chosen in such a manner that the viewer can comfortably and clearly see the display contents that are displayed. At the same time, a transparent state of the rest of the display panel, i.e., the region on the display panel that is not occupied by the at least one graphic display object, is maintained so that the viewer can have a view of the traffic in front of the vehicle to the display panel and the windscreen in order to drive the vehicle safely. However in the case of the autonomous driving or the self-driving of the vehicle, the user may lay back on his driving seat and have a view of the display panel. In this case, the display panel can be adjusted in such a way that the at least one graphic display object or a plurality of various graphic display objects can occupy the whole display panel in such a manner that the user can enjoy the other functionalities of the display device in a comfortable manner. For example, such functionalities can be a graphic display object in form of a video of an infotainment system or a plurality of graphic display objects, since in the case of the autonomous driving or self-driving situation, the user is independent of the responsibilities of driving. It is further thinkable that the degree of transmission of light through the plurality of the primary subareas can be adjusted in such a manner that depending on the viewing direction of the user, a particular region on the display panel can have a reduced degree of the transmission of light as compared to a region corresponding to the view angle of the user, such that a user can have a light vision of the traffic through this particular region through the display panel and the windscreen, even in the case of the self-driving situation of the vehicle. It is further thinkable, that the control unit of the display device is designed to adjust a respective light transmission to a predetermined individual degree for each of the plurality of the predetermined primary subareas of the second layer and each of the plurality of the aforementioned predetermined secondary subareas of the third layer independent of each of the respective primary subareas and the respective secondary subareas in dependence with a driving situation of the vehicle.

There are also various combinations of the features of the described embodiments, if not stated otherwise.

BRIEF DESCRIPTION OF THE DRAWINGS

These and other aspects and advantages will become more apparent and more readily appreciated from the following description of an exemplary implementation, taken in conjunction with the accompanying drawings of which.

DETAILED DESCRIPTION

Figure 1:
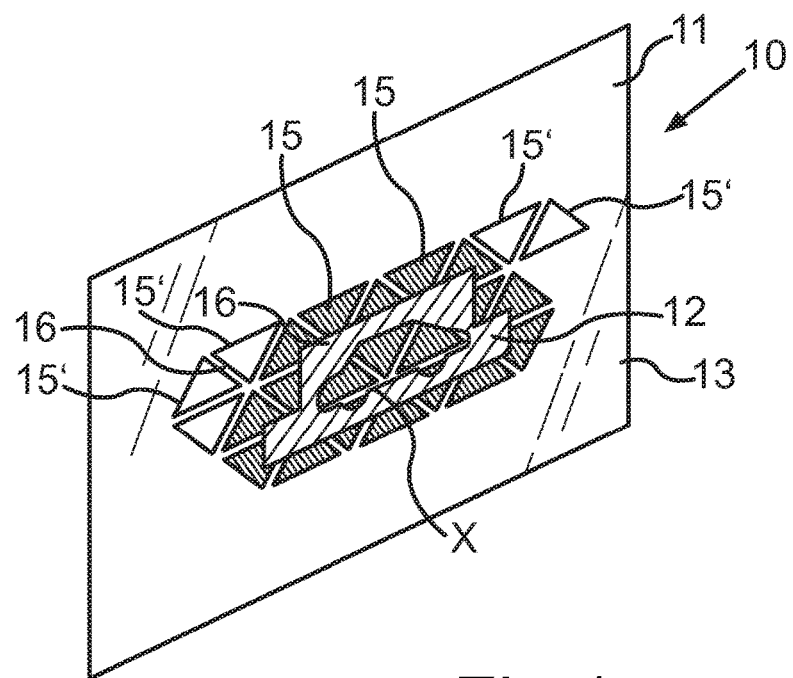
FIG. 1 is a schematic illustration of an embodiment of a display device.

Reference will now be made in detail to the preferred embodiments, examples of which are illustrated in the accompanying drawings, wherein like reference numerals refer to like elements throughout.

An embodiment is explained in the following with components that each represent individual features of which are to be considered independently of each other and are also to be regarded as a component in an individual manner or in another than the shown combination. Furthermore, the described embodiment can also be supplemented by further features already described.

In the figures identical reference signs indicate elements that provide the same function.

Figure 2:
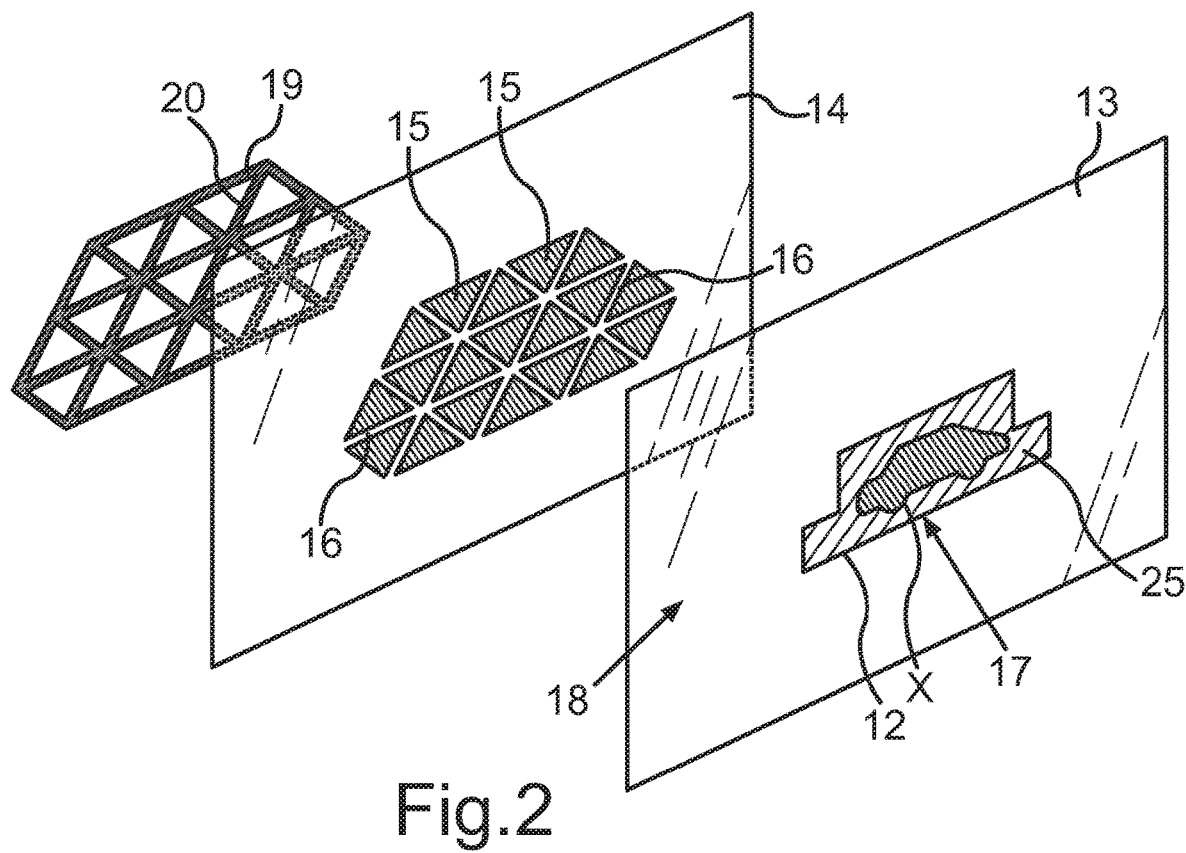
FIG. 2 is an exploded illustration of an embodiment of the display device with a first layer, a second layer and a third layer.
Figure 13:
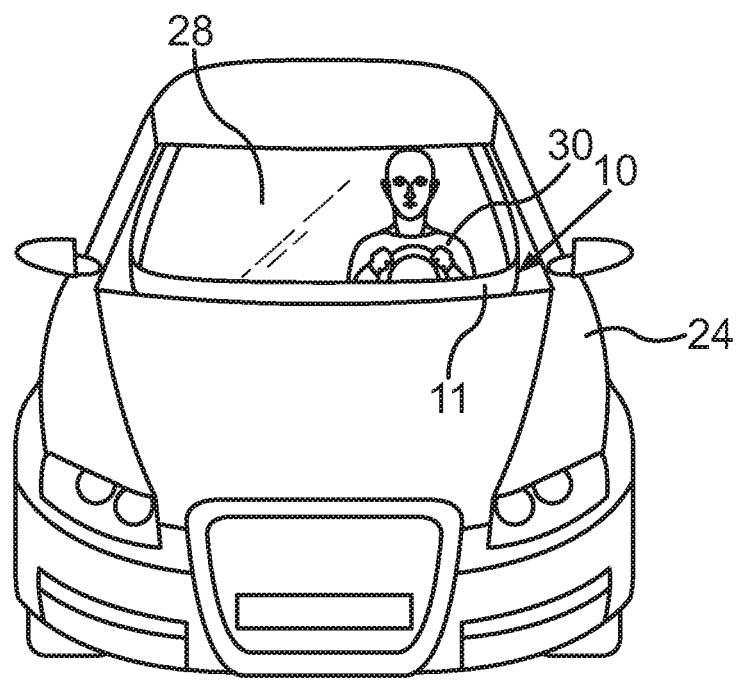
FIG. 13 is a front view of the vehicle with the display device.

FIG. 1 shows a schematic diagram of an embodiment of a display device 10. The display device 10 has a display panel 11 for displaying at least one graphic display object 12. The display panel 11 can be in form of a touch screen and can function as a user interface, wherein a user 30, as shown in FIG. 13, can communicate with the other devices (not shown in figures.) in a vehicle 24 by a touch or a voice signal or a gesture or by a remote control unit (not shown in figures) through the display panel 11. The at least one graphic display object 12 may be a logo or an app, for the sake of understandability the at least one graphic display object 12 shown in the FIG. 1 and FIG. 2, is in the form of an of a car shaped figure X with a colored background 25, which can be red in color (the red color is shown by inclined lines or pattern). The figure X may be a black color. The display panel 11 has a first layer 13 and a second layer 14, wherein the first layer 13 is a pixel matrix. The first layer 13 can be in form of a TOLED screen or an OLED screen or a TFT screen. Furthermore, the display device 10 may have a control unit (not shown in figures). The control unit is designed to activate at least one pixel element of the pixel matrix (not shown in figures) for displaying the at least one graphic display object 12, wherein in a non-activated state each pixel element is transparent.

The second layer 14 is partitioned into a plurality of primary subareas 15, 15' having an adjustable degree of light transmission. The primary subareas 15, 15' may be in the form of quadrilateral shapes or triangular shapes or polygonal shapes or a mixture of the aforementioned shapes. As shown in the FIG. 1, the primary subareas 15, 15' are in triangular forms. The primary subareas 15, 15' of the second layer 14 can be designed to allow a transmission of electricity or can be electrically conductive. In order to achieve an adjustable degree of light transmission, a voltage difference can be enabled across each of the primary subareas 15, 15'. This can enable a transformation of each of the primary subareas 15, 15' from a transparent state to an opaque state depending on the degree of the voltage difference across that particular primary subarea 15, 15'. Furthermore, in the case of PDLC or DSLC, the primary subareas 15, 15' can be transformed to a state between the opaque state and the transparent state. As shown in FIG. 1, the primary subareas 15 are in the opaque state, whereas the primary subareas 15' are in the transparent state.

The voltage difference across each of the primary subareas 15, 15' can be adjusted by a wiring due to which, each of the primary subareas 15, 15' are separated or are surrounded by a primary space 16 between each of them. The primary space 16 can enable the wiring across the respective primary subarea 15, 15'. The wiring can enable the voltage difference across that particular primary subarea 15, 15'. The control unit is adapted to adjust a respective light transmission to a predetermined individual degree for each of the plurality of the predetermined subareas 15 of the second layer 14 independent of each of the other primary subareas 15'. For the sake of understandability the other primary subarea 15' is shown in the FIG. 1, which are in the transparent state.

For example, when a display region 17 is selected on the display panel 11, in order to display the at least one graphic display object 12 on the display region 17, the control unit is designed to activate the pixel elements of the first layer 13 corresponding to the display region 17, such that the pixel elements corresponding to the display region 17 radiate light in the respective colors associated with the at least one graphic display object 12. However, a remaining part of the display panel 11 outside the display region 17, that is a non-displaying region 18, remains transparent. In this case, the pixel elements corresponding to the non-displaying region 18 remain in a non-activated state due to which each of the pixel elements corresponding to the non-displaying region 18 remain transparent. In order to display the graphic display object 12 on the display panel 11, the control unit is designed to determine the respective primary subareas 15, which are at least partly occupied by the at least one graphic display object 12. The primary subareas 15, which are at least occupied by the at least one graphic display object 12, are turned opaque by changing the voltage difference across each of the corresponding primary subareas 15 corresponding to the display region 17. The control unit is adapted to adjust the light transmission of the respective primary subareas 15 to a degree lower than that of the primary subareas 15', which are not at least partly occupied by the graphic display object 12.

Figure 3:
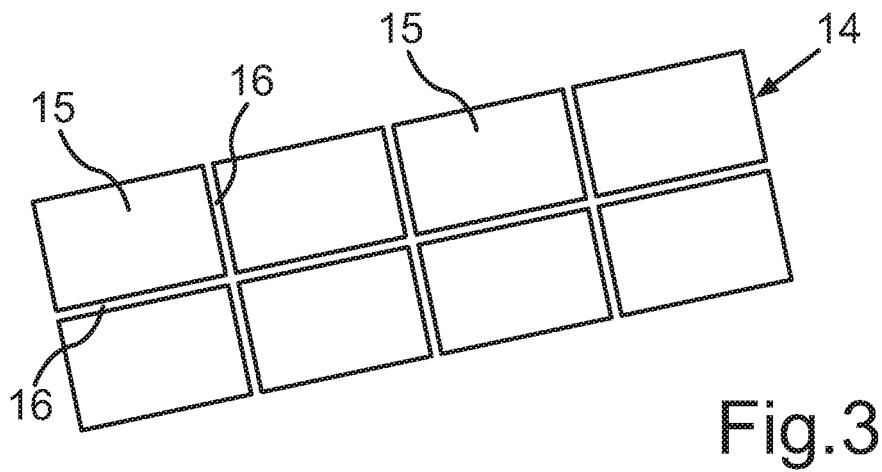
FIG. 3 is a schematic illustration of an embodiment of the display device with a plurality of primary subareas on the second layer.
Figure 4:
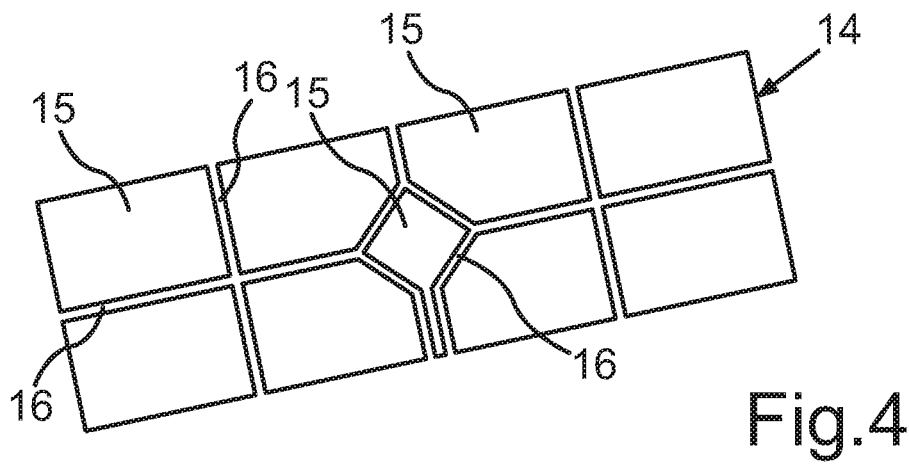
FIG. 4 is a schematic illustration of another embodiment of the display device with a plurality of primary subareas on the second layer.
Figure 5:
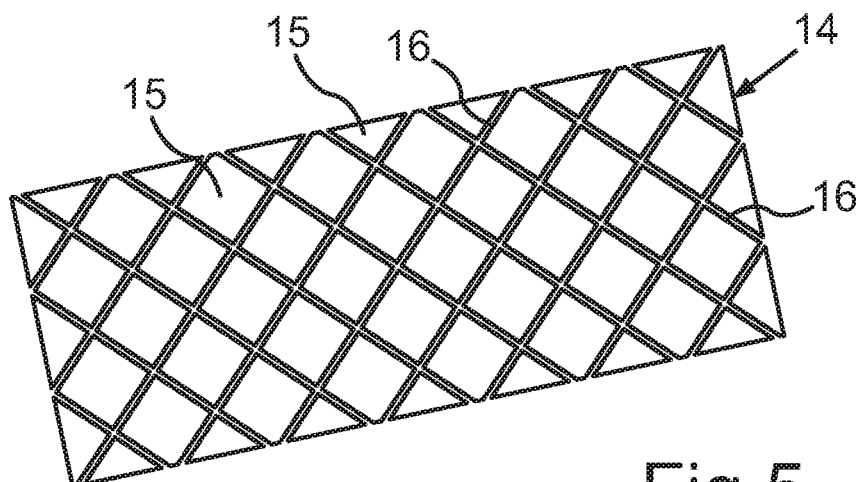
FIG. 5 is a schematic illustration of yet another embodiment of the display device with a plurality of primary subareas on the second layer.

Furthermore, in case of a PDLC or a DSLC screen the plurality of primary subareas 15, 15' can be in touch with a border of the second layer 14, as shown in FIG. 3. The primary subareas 15, 15' can be also in form of floating elements, as shown in FIG. 4, however, in this case primary space needs to be 4 mm wide which can lead to an unattractive pattern. Furthermore, in the case of a transparent LCD, the primary space 16 can be much narrow about 0.2-0.4 mm, as shown in FIG. 5.

As shown in FIG. 1, the graphic display object 12 has a colored region, for example the red colored background 25, and the figure X in black color. Hence, it is necessary to achieve the black color of the figure X. Furthermore, since an ideal 100 percent transparency is difficult to achieve, if, for example, the transparency may be around 40 percent and figure X may have a grey value of 60 percent, then with a large amount of light from the back or outside, the figure X may appear as very light grey.

However, a TOLED can display several colors except black but due to the fact that transparency may not be 100 percent, it can display grey color, especially when there may be a little light from the back or outside of the TOLED, it will appear grey and when there is a lot or enough light, it will appear whiter. In order to achieve the black color, each of the primary subareas 15, 15' can be of black color, such that when they are in an opaque state (primary subareas 15), they depict a black background or black region or black image and when they are in a transparent state (primary subareas 15'), they are in the colorless transparent form. As shown in FIG. 1, a region of the second layer corresponding to the display region 17 of the first layer 13 has primary subareas 15, which are black in color. In order to display the black colored figure X, the primary subareas 15 covered by the figure x are turned opaque and the pixel elements of the first layer remain in the non-actuated state, so that the part of the first layer 13 conversing the figure X remains transparent. Hence, the figure x will be depicted by the black colored primary subareas 15 covered at least partly by the figure X.

Figure 7:
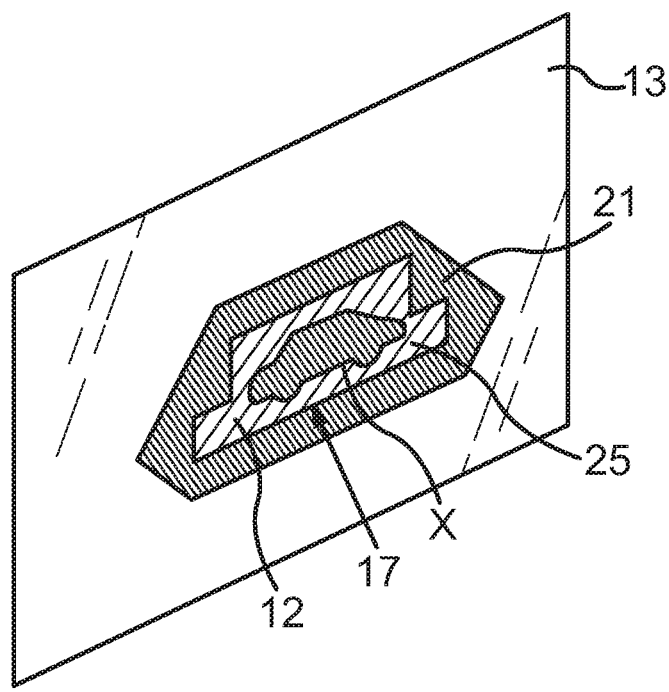
FIG. 7 is a schematic illustration of the display device having a homogeneous black background with a graphic display object.

FIG. 1 depicts that the graphic display object 12 is displayed on the display panel 11 in the display region 17. However, the primary spaces 16 between each of the primary subareas 15 can be seen as transparent lines or grey lines depending on the transparency, in the black colored figure X. Moreover, the primary spaces 16 can be seen as transparent lines, be-tween the black colored primary subareas 15 which are in the opaque state. However, this is undesirable and rather a homogeneous black figure X is desired, as shown in FIG. 7. In order to achieve a homogeneous black background, the display panel 11 has a third layer 19, wherein the third layer 19 is designed to attenuate light in the primary space 16 be-tween each of the primary subareas 15, 15'.

The third layer 19 can have a webbed structure 20, wherein the webbed structure 20 can be an opaque material and can be designed to cover the primary space 16 between each of the primary subareas 15, 15'. For the sake of understandability, as shown in FIG. 2, the webbed structure 20 can cover the primary space 16 between the primary subareas 15, which are in an opaque state.

Figure 6:
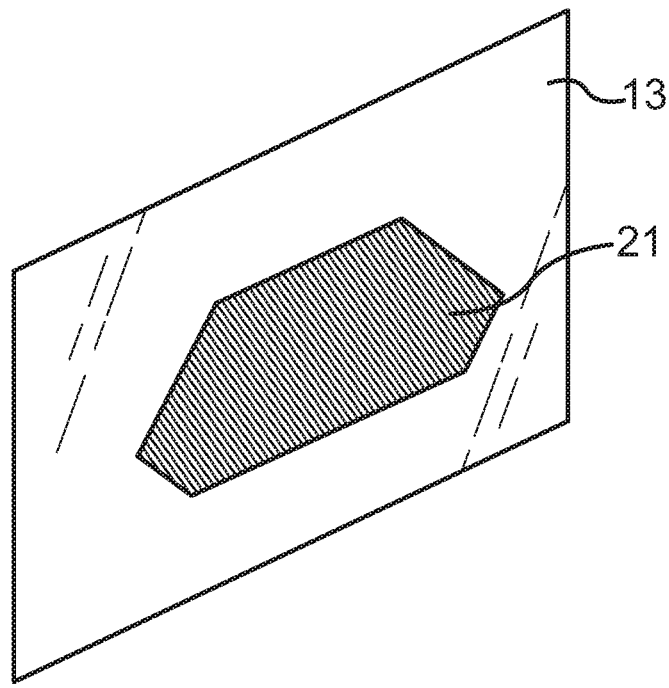
FIG. 6 is a schematic illustration of the display device having a homogeneous black background.
Figure 8:
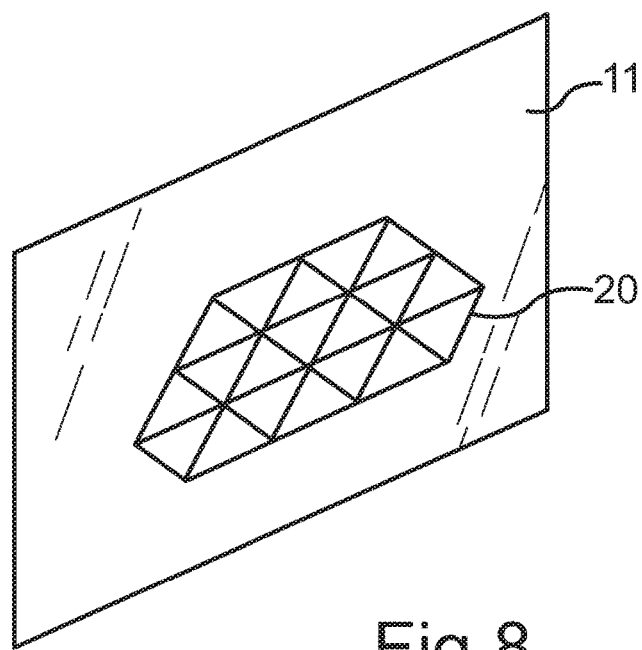
FIG. 8 is a schematic illustration of the display device in a transparent state.

The opaque material may be a black color or grey color. FIG. 6 depicts a homogeneous black region 21, wherein the first layer 13 is in the transparent state, that is all the pixel elements of the pixel matrix of the first layer 13 are in the respective non-actuated state. The homogeneous black region 21 can include the third layer 19 along with the webbed structure 20. FIG. 7 shows a display of the homogenous black colored figure X on the homogeneous black region 21. It can be seen that no primary space 16 can be observed in the depicted homogeneous black region 21 as well as in black colored figure X. However, when both the first layer 13 and second layer 14 are in fully a transparent state, then the webbed structure 20 of the attached third layer 19 can be seen as a black pattern on the display panel 11, as shown in FIG. 8. It is further possible to print the webbed structure 20 in a grey tone or color, so that an optimum can be obtained between the quality of the black region 21 and the visibility of the webbed structure 20, when the display panel 11 is completely transparent.

Figure 9:
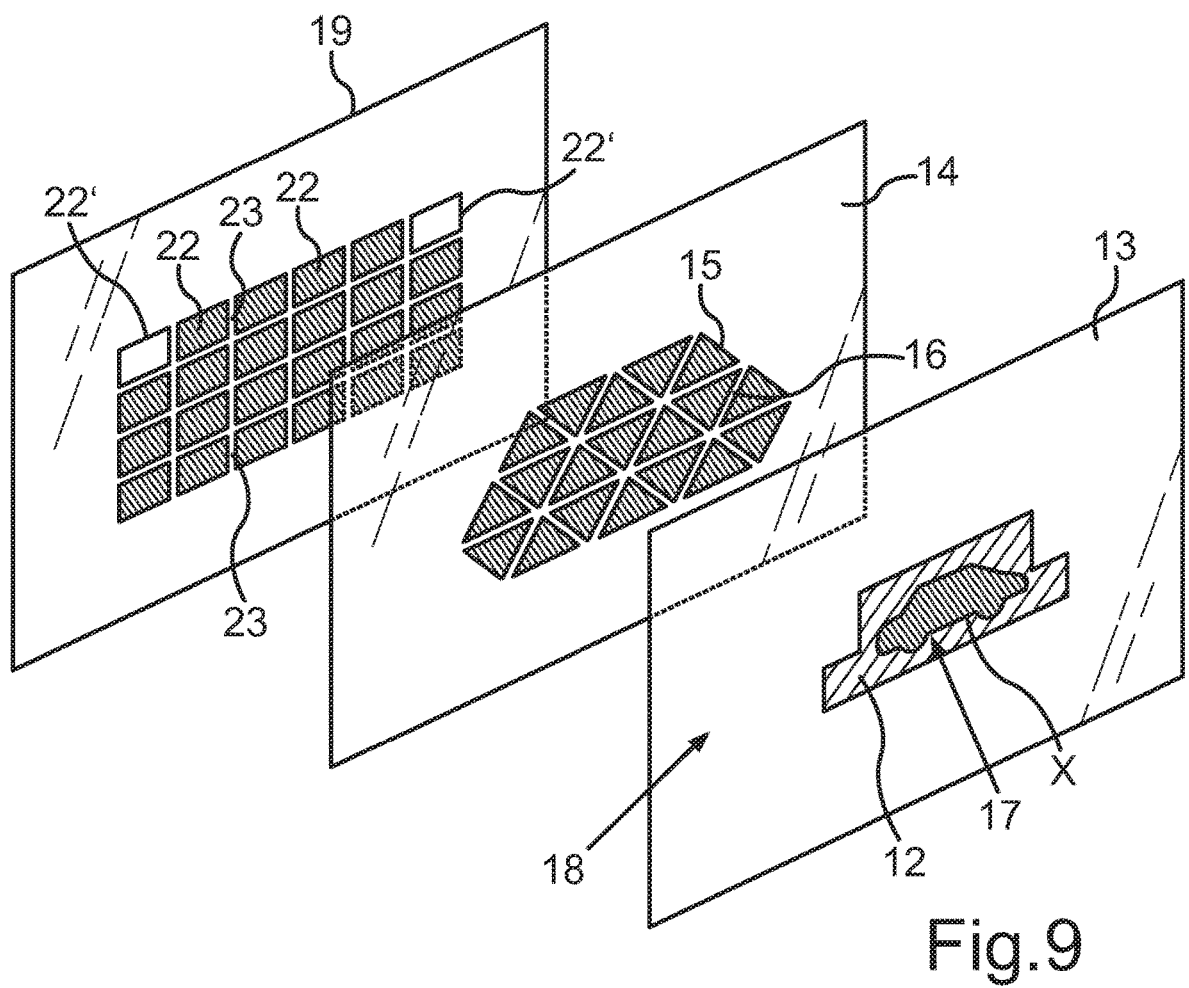
FIG. 9 is an exploded illustration of an embodiment of the display device with the first layer, the second layer and the third layer.

FIG. 9 depicts an explosion illustration of another embodiment of the display device 10, wherein the third layer 19 has a plurality of predetermined secondary subareas 22, 22' having an adjustable degree of light transmission. The secondary subareas 22, 22' are separated or surrounded by a secondary space 23 between each of them. The control unit is adapted to adjust a respective light transmission to a predetermined individual degree for each of the plurality of the predetermined secondary subareas 22, 22' of the third layer 19 independent of each of the other secondary subareas 22, 22'. For the sake of understandability, the secondary subareas 22' are in the transparent state, as shown in the FIG. 9, whereas the secondary subareas 22 are in the opaque state and are black in color. Furthermore, for the sake of understandability, the secondary subareas 22, 22' are quadrilateral shaped as compared to the primary subareas 15, 15' which are triangular shaped.

Figure 10:
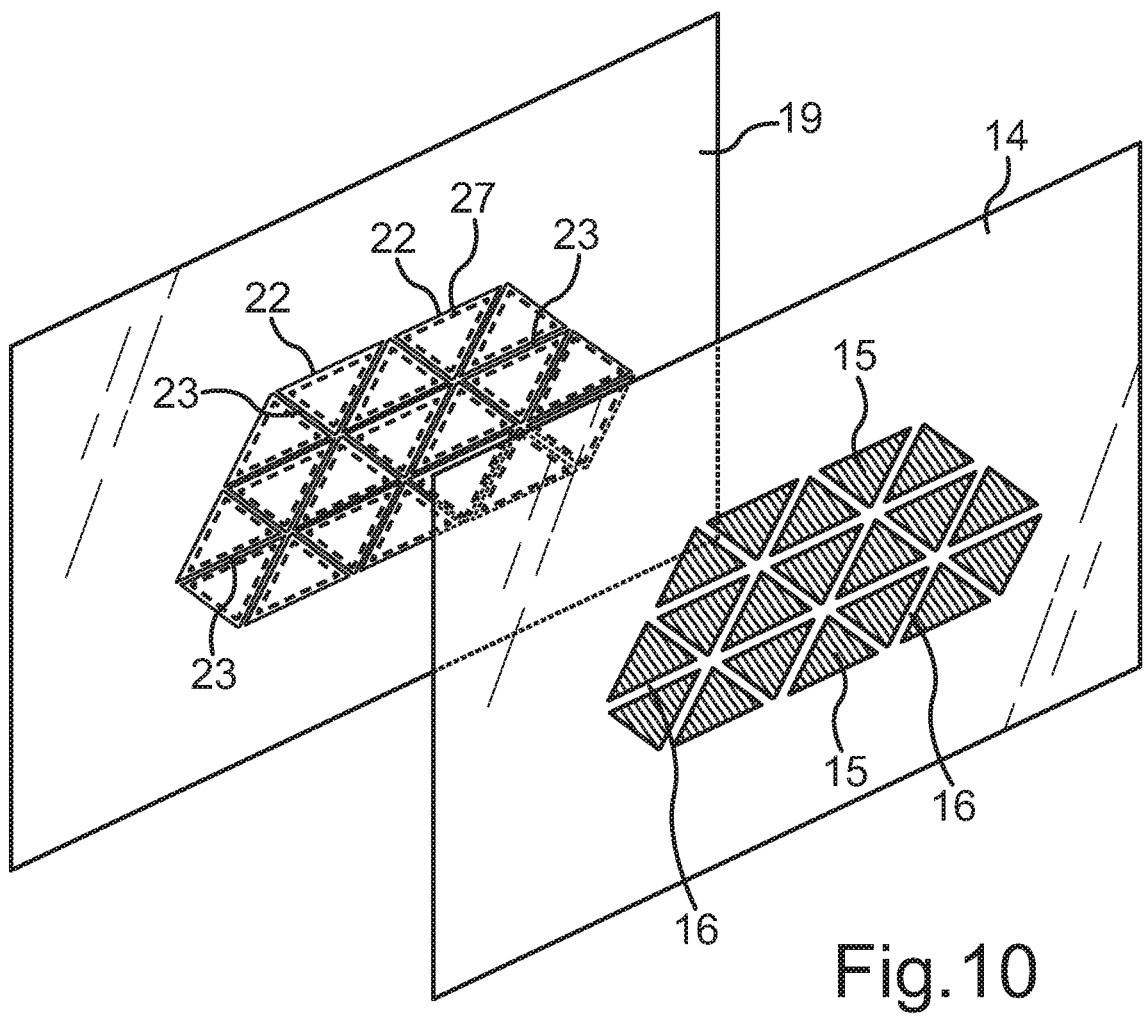
FIG. 10 is an exploded illustration of an embodiment of the display device including the second layer and the third layer.

FIG. 10 depicts an explosion illustration of another embodiment of the display device 10, wherein the plurality of predetermined secondary subareas 22 of the third layer 19 are triangular shaped. Dashed lines 27 represent a position of each of the plurality of predetermined primary subareas 15, when the first layer 13 and the second layer 14 are attached or are brought close to each other. It can be seen that the size, shape and arrangement of the secondary subareas 22 is chosen, such that secondary subareas 22 overlap or cover the primary space 16 between each of the plurality of the predetermined primary subareas 15.

Figure 11:
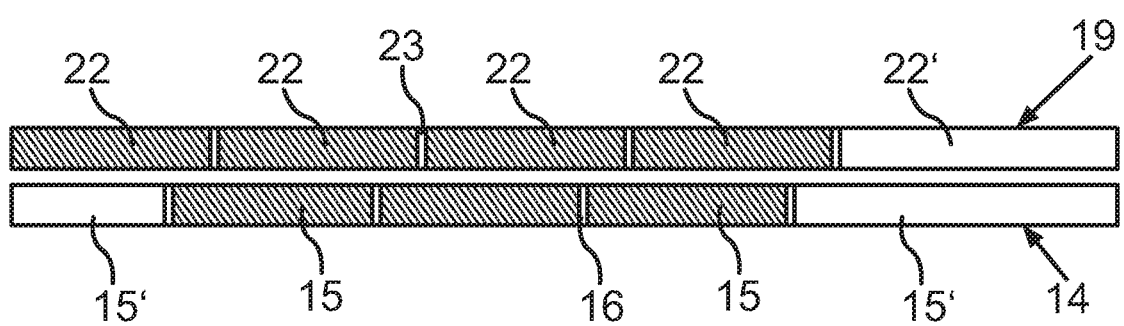
FIG. 11 is a side view of an embodiment of the display device with the second layer and the third layer.

The plurality of the predetermined secondary subareas 22, 22' are arranged such that each of the plurality of the predetermined secondary subareas 22, 22' cover the primary space 16 between each of the plurality of the predetermined primary subareas 15, 15' either partly or completely, as shown in a side view of the second layer 14 and the third layer 19 in FIG. 11.

Furthermore the control unit is designed to determine the respective primary subareas 15 and the respective secondary subareas 22, which are at least partly occupied by the graphic display object 12. The control unit is adapted to adjust the light transmission of the respective primary subareas 15 and respective secondary subareas 22 to a degree lower than that of the other primary subareas 15' and the secondary subareas 22', which are not at least partly occupied by the at least one graphic display object 12. Hence, such an arrangement of the display panel 11 with the first layer 13, the second layer 14 and the third layer 19 having a plurality of predetermined secondary subareas 22, 22' can lead to the formation of a homogeneous black region (not shown in figures) which can be similar to the homogenous black region 21.

Figure 12:
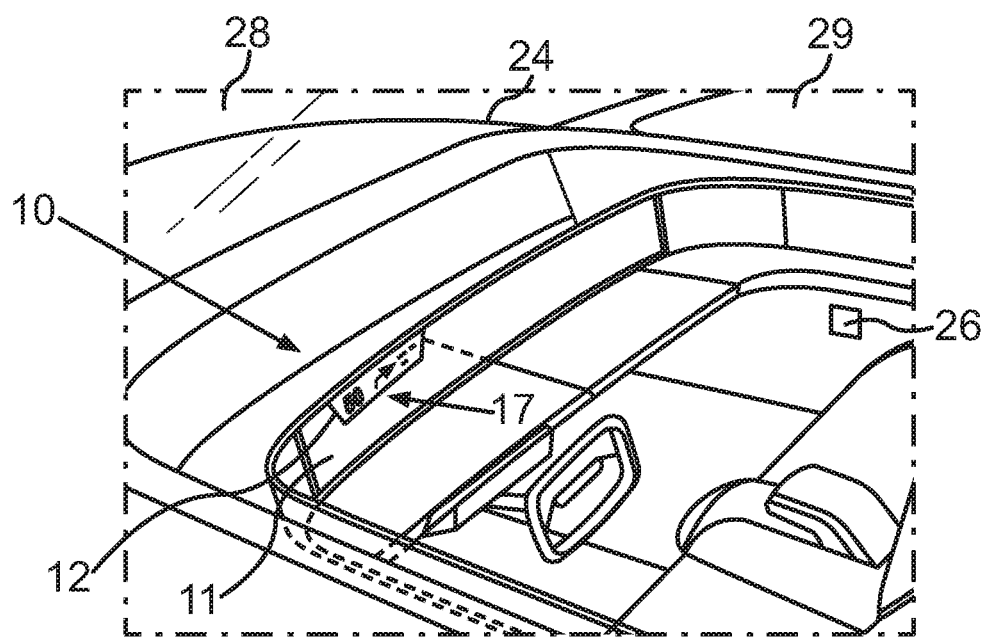
FIG. 12 is a schematic illustration of a portion of a vehicle with the display device.

FIG. 12 shows the vehicle 24 with the display device 10. The vehicle 24 can be a motor vehicle which can be driven manually or can be self-driving. Furthermore, the display device 10 can be integrated in the vehicle 24 in front of a windscreen 28, that is the region in front of the user 30 of the vehicle 24. It is further thinkable that such a display device 10 can be integrated in other parts of the vehicle 24, for example on a window panels 29 of the vehicle 24 or window panels of a passenger vehicle such as a bus. The display device 10 can further include a gaze tracking unit 26, such as a camera. The gaze tracking unit 26 is designed to track a view direction of the user. The control unit can be designed to determine the display region 17 corresponding to the at least one graphic display object 12 and the predefined plurality of primary subareas 15 and the secondary subareas 22 in accordance with the tracked view direction. Furthermore, the control unit of the display device 10 can be designed to adjust a respective transmission of light to the predetermined individual degree for each of the plurality of the predetermined primary subareas 15, 15' of the second layer 14 and each of the plurality of the predetermined secondary subareas 22, 22' of the third layer 19 independently of each of the other primary subareas 15, 15' and the other secondary subareas 22, 22' in accordance with a driving situation of the vehicle 24.

FIG. 13 shows a front view of the vehicle 24, wherein the user 30 can access the display device 10 comfortably while driving, since is integrated in front of the windscreen 28 of the vehicle 24 and is located at a reachable distance from the user 30.

Overall, the examples show how the display device 10 enables the display of the display contents of the at least one graphic display object 12 on the display panel 11 in an efficient manner.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A display device, comprising:
   a display panel configured to display at least one graphic display object, the display panel having first, second and third layers, the first layer having a pixel matrix of individually addressable pixel elements, each pixel element of the pixel matrix being transparent in a non-actuated state, the second layer having primary subareas, each primary subarea encompassing multiple pixel elements and having a first individually adjustable degree of light transmission, the primary subareas being separated by primary spaces, the third layer having a second individually adjustable degree of light transmission in secondary subareas overlapping the primary spaces between the primary subareas; and
   a control unit configured to actuate at least one pixel element of the pixel matrix to display the at least one graphic display object and adjust the first individually adjustable degree of light transmission to a first predetermined individual degree for each of the primary subareas of the second layer independent of all other primary subareas.

2. The display device according to claim 1, wherein the control unit is further configured to
   determine specified primary subareas at least partly occupied by the at least one graphic display object; and
   adjust the first individually adjustable degree of light transmission of the specified primary subareas to a lower degree than remaining primary subareas not occupied by the at least one graphic display object.

3. The display device according to claim 2,
   wherein, in the third layer, the secondary subareas are separated by secondary spaces, and
   wherein the control unit is further configured to adjust the second individually adjustable degree of light transmission to a second predetermined individual degree for each of the secondary subareas of the third layer independent of all other secondary subareas.

4. The display device according to claim 3, wherein each of the secondary subareas covers at least one of the primary subareas and at least partly covers the primary spaces around the at least one of the primary subareas.

5. The display device according to claim 4, wherein the control unit is further configured to
   determine the specified primary subareas and specified secondary subareas at least partly occupied by at least one graphic display object, and
   adjust the light transmission of the specified primary subareas and the specified secondary subareas to a lower degree than the remaining primary subareas and remaining secondary subareas not occupied by the at least one graphic display object.

6. The display device according to claim 5,
   wherein the display device comprises a gaze tracking unit configured to track a view direction of a user, and
   wherein the control unit is configured to determine a display position of the at least one graphic display object on predefined primary subareas based on the view direction of the user.

7. The display device according to claim 1,
   wherein, in the third layer, the secondary subareas are separated by secondary spaces, and wherein the control unit is further configured to adjust the second individually adjustable degree of light transmission to a second predetermined individual degree for each of the secondary subareas of the third layer independent of all other secondary subareas.

8. The display device according to claim 7, wherein each of the secondary subareas covers at least one of the primary subareas and at least partly covers the primary spaces around the at least one of the primary subareas.

9. The display device according to claim 8, wherein the control unit is further configured to
determine specified primary subareas and specified secondary subareas, at least partly occupied by at least one graphic display object, and
adjust the light transmission of the specified primary subareas and the specified secondary subareas to a lower degree than remaining primary subareas and remaining secondary subareas not occupied by the at least one graphic display object.

10. A vehicle, comprising:
a chassis; and
a display device, including
a display panel configured to display at least one graphic display object, the display panel having first, second and third layers, the first layer having a pixel matrix of individually addressable pixel elements, each pixel element of the pixel matrix being transparent in a non-actuated state, the second layer having primary subareas, each primary subarea encompassing multiple pixel elements and having a first individually adjustable degree of light transmission, the primary subareas being separated by primary spaces, the third layer having a second individually adjustable degree of light transmission in secondary subareas overlapping the primary spaces between the primary subareas; and
a control unit configured to actuate at least one pixel element of the pixel matrix to display the at least one graphic display object and adjust the first individually adjustable degree of light transmission to a predetermined individual degree for each of specified primary subareas of the second layer independent of remaining primary subareas.

11. The vehicle according to claim 10, wherein the control unit of the display device is further configured to adjust the first individually adjustable degree of light transmission for each of the specified primary subareas of the second layer in dependence upon a driving situation of the vehicle.

12. The vehicle according to claim 11, wherein the control unit is further configured to
determine specified primary subareas at least partly occupied by the at least one graphic display object; and
adjust the first individually adjustable degree of light transmission of the specified primary subareas to a lower degree than remaining primary subareas not occupied by the at least one graphic display object.

13. The vehicle according to claim 12,
wherein, in the third layer, the secondary subareas are separated by secondary spaces, and
wherein the control unit is further configured to adjust the second individually adjustable degree of light transmission to a second predetermined individual degree for each of the secondary subareas of the third layer independent of all other secondary subareas.

14. The vehicle according to claim 13, wherein each of the secondary subareas covers at least one of the primary subareas and at least partly covers the primary spaces around the at least one of the primary subareas.

15. The vehicle according to claim 14, wherein the control unit is further configured to
determine the specified primary subareas and specified secondary subareas at least partly occupied by at least one graphic display object, and
adjust the light transmission of the specified primary subareas and the specified secondary subareas to a lower degree than the remaining primary subareas and remaining secondary subareas not occupied by the at least one graphic display object.

16. The vehicle according to claim 15,
wherein the display device comprises a gaze tracking unit configured to track a view direction of a user, and
wherein the control unit is configured to determine a display position of the at least one graphic display object on predefined primary subareas based on the view direction of the user.

17. The vehicle according to claim 10,
wherein, in the third layer, the secondary subareas are separated by secondary spaces, and
wherein the control unit is further configured to adjust the second individually adjustable degree of light transmission to a second predetermined individual degree for each of the secondary subareas of the third layer independent of all other secondary subareas.

18. The vehicle according to claim 17, wherein each of the secondary subareas covers at least one of the primary subareas and at least partly covers the primary spaces around the at least one of the primary subareas.

* * * * *